United States Patent
Collins et al.

(10) Patent No.: US 7,630,934 B1
(45) Date of Patent: Dec. 8, 2009

(54) AUTOMATED CREDIT RISK MANAGEMENT

(75) Inventors: Joseph C. Collins, Anaheim, CA (US);
Susan M. Smith, Oak Park, IL (US);
LaVerne Jenkins, Chicago, IL (US);
Richard Burke, Coppell, TX (US);
Jesse Guzman, Cedar Park, TX (US);
Jackie Mooney, Huntersville, NC (US);
Dennis Niesing, Mission Viejo, CA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 12/034,162

(22) Filed: Feb. 20, 2008

(51) Int. Cl.
*G06Q 40/00* (2006.01)

(52) U.S. Cl. .......................... 705/38; 705/35

(58) Field of Classification Search .............. 705/1, 705/38, 14, 30, 39, 35, 36, 40, 37; 719/314; 345/204; 715/200; 463/1
See application file for complete search history.

(56) References Cited

U.S. PATENT DOCUMENTS

2003/0187766 A1 * 10/2003 Akashi ................. 705/35

2005/0010522 A1 * 1/2005 Kusu ..................... 705/37

OTHER PUBLICATIONS

"Analysis of required and matching loan qualities in financial institutions", Author—Lin, T. T., Dept. of Int. Bus., National Dong Hwa Univ., Hualien, Taiwan, Journal of Statistics & Management Systems, vol. 9, No. 1, pp. 105-122.*

* cited by examiner

*Primary Examiner*—Mary Cheung
*Assistant Examiner*—John H Holly
(74) *Attorney, Agent, or Firm*—Michael A. Springs; Moores & Van Allen PLLC (57) ABSTRACT

A system and method for automated credit risk management where current information on at least one marketable securities loan of at least one person is periodically collected. Current information on collateral associated with each at least one marketable securities loan is periodically collected. Current stock market information associated with the collateral is periodically collected. The collected marketable securities loan information, collateral information, and stock market information are processed and correlated and stored. A marketable collateral distribution across each at least one marketable securities loan including collateral shared across portfolios of the at least one person may be automatically calculated. The stored processed and correlated information is usable by a user at the workstation for loan to value evaluation, margin monitoring, collateral evaluation and analysis, ability to advance funds assessment, ability to release funds from pledged collateral accounts, or risk management modeling.

20 Claims, 4 Drawing Sheets

AUTOMATED CREDIT RISK MANAGEMENT

BACKGROUND OF THE INVENTION

The present invention is related to credit risk management, and more specifically to automated credit risk management.

The process for providing a loan to an individual can be fairly simple. The individual is analyzed and rated to determine if qualified for the loan, collateral for the loan is identified and provided, and the individual may then be given the loan. Currently, it is common that collateral available for securing loans may be shared to cover multiple loans for one or more individuals. With loan sharing of collateral, two or more loans may go against a single form of collateral or to go against shared multiple forms of collateral. Therefore, for example, one loan may be covered by two forms of collateral or two loans may be covered by the same collateral. The use of liquid collateral in the form of securities readily traded on an acceptable national exchange can create operational risk in terms of documentation requirements, monitoring collateral values, regulatory reporting and prompt/consistent enforcement of the financial institution polices and procedures. Marketable Securities loans are also subject to market risk. Factors considered in assessing market risk may include trading volume, price volatility, share price, event risk, market movement, analyst option, Kealhofer McQuown Vasicek (KMV) score, industry analysis, impediments to liquidating securities (i.e., control and restricted stock), and time required to liquidate.

Currently, a variety of manual approaches are being employed to mitigate risks associated with collateral allocation, liquidation, release control, control and restricted stock (Rule 144 & 145) and concentrated positions in relation to loan and collateral portfolio monitoring. One common approach includes manually copying or entering data into a variety of worksheets from various data sources, and applying formulas to determine the outcome under various and regularly changing conditions. This is a manual process and includes the use of a variety of spreadsheets set up for use with a variety of collateral and loan configurations. This process takes several days to complete and is prone to error.

BRIEF SUMMARY OF THE INVENTION

According to one aspect of the present invention, a method for automated credit risk management includes collecting current information on at least one marketable securities loan of at least one person, collecting current information on collateral associated with each at least one marketable securities loan, collecting current stock market information associated with the collateral, and processing and correlating the collected marketable securities loan information, collateral information, and stock market information.

According to another aspect of the present invention, a system for automated credit risk management includes a marketable securities loan subsystem, the marketable securities loan subsystem comprising at least one server containing information on at least one marketable securities loan for at least one person, a collateral subsystem, the collateral subsystem comprising at least one server containing information on collateral related to the marketable securities loan, a securities subsystem, the securities subsystem comprising at least one server containing most recent stock market information on securities associated with the collateral, an automated risk management system (ARMS), the ARMS automatically periodically retrieving the information on the at least one marketable securities loan, the collateral related to the marketable securities loan, and the stock market and processing and correlating the retrieved information; and at least one workstation, each at least one workstation capable of accessing the ARMS and using the processed and correlated information to calculate a marketable collateral distribution across each at least one marketable securities loan including collateral shared across portfolios of the at least one person.

According to another aspect of the present invention, a method for collateral evaluation includes receiving information regarding a marketable securities loan of a person, receiving information regarding all collateral associated with the marketable securities loan, the information including current market values of all the collateral and a marketable securities loan distribution of the collateral, and automatically displaying desired information responsive to input criteria, the desired information being based on an analysis of the marketable securities loan information and the collateral information in view of the input criteria.

According to another aspect of the present invention, an apparatus comprising a storage medium with instructions stored therein, the instructions when executed causes a processing device to perform: collecting current information on at least one marketable securities loan of at least one person, collecting current information on collateral associated with each at least one marketable securities loan, collecting current stock market information associated with the collateral, processing and correlating the collected marketable securities loan information, collateral information, and stock market information, and calculating a marketable collateral distribution across each at least one marketable securities loan including collateral shared across portfolios of the at least one person.

According to another aspect of the present invention, an apparatus comprising a storage medium with instructions stored therein, the instructions when executed causes a processing device to perform: receiving information regarding a marketable securities loan of a person, receiving information regarding all collateral associated with the marketable securities loan, the information including current market values of all the collateral and a marketable securities loan distribution of the collateral, and automatically displaying desired information responsive to input criteria, the desired information being based on an analysis of the marketable securities loan information and the collateral information in view of the input criteria.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Automated credit risk management according to embodiments of the present invention automatically captures collateral from various banking systems to establish relationships between customer marketable securities loans and accounts on other bank systems that are collateral for marketable securities loans in both private banks and commercial banks. After linking the customer relationships and collateral, embodiments according to the present invention calculate the collateral value at various levels. The value of marketable collateral may be automatically determined and a collateral distribution (e.g., allocating marketable securities loans based upon a collateral type) may be calculated across multiple marketable securities loans in relationships where collateral is shared across a customers portfolio and/or shared with other customers in another portfolio.

According to embodiments of the present invention, current marketable securities loan information for one or more persons, current collateral information associated with each of the marketable securities loans, current market values of the collateral, and other information may be all collected automatically on a regular and periodic basis and stored by one or more servers in a storage device or database. Users or administrators that service customers related to the marketable securities loans may access these servers from workstations and use an evaluation tool at the workstation to analyze and present information related to the collected and stored data to allow the user or administrator to make decisions regarding one or more customer's portfolios. The user or administrator may enter different criteria and vary the criteria in order to perform different "what-if" analyses of a customer's portfolio. For example, if a marketable securities loan for a particular customer uses collateral from two different sources, a user or administrator may use an evaluation tool at a workstation to access the servers and vary portions of the collateral allocated to a particular marketable securities loan of a customer to identify any benefits this may produce.

According to embodiments of the present invention, an evaluation tool at a workstation automates the creation of detailed marketable securities loan and collateral analysis. The analysis may include a marketable securities loan portfolio summary section displaying all marketable securities loans, marketable securities loan balances, marketable securities loan-to-value (LTV), and marketable securities loan status (i.e. in margin, out of margin, vulnerable, etc.) for all marketable securities loans in a selected collateral pool. The evaluation tool may also display details of collateral items from all sources, daily collateral values and a collateral frequency distribution. The evaluation tool may also provide marketable securities loan surplus or shortfall information, facility amount available to advance and amount available to release by collateral rate. According to embodiments of the present invention, a daily model of bank marketable securities loan portfolios may be built for analysis for credit risk and a bank's exposure based on the marketable securities loan portfolio and collateral positions on a plurality of marketable securities loans and over a plurality of individual assets within the collateral pools. For example, a daily model of a marketable securities loan portfolio including affiliate collateral identified, and qualitative and quantitative 23 A&B regulatory analysis completed and available for reporting, may be created.

Embodiments according to the present invention provide an automated process to support credit risk reporting that tracks, monitors and controls all marketable collateral and collateral exceptions booked to secure marketable securities loans on a financial institution's private bank and commercial bank marketable securities loan systems, promotes proactive and action-oriented behavior by communication of alerts and alarms and credit action triggers, revalues collateral, recalculates margin maintenance, and identifies "margin calls" and asset positions periodically (e.g., daily) and provides decision support functionality for rapid response to customer inquires by allowing an administrator (via a workstation using an evaluation tool) to access data, put in criteria and analyze the data based on the input criteria. For example, there may be several proactive alerts such as alerts regarding vulnerable marketable securities loans and alerts regarding exception reports that may be automatically sent to a workstation or manually requested that allow a user to spot trends and assess current aspects of a risk profile of a borrower.

Figure 1:
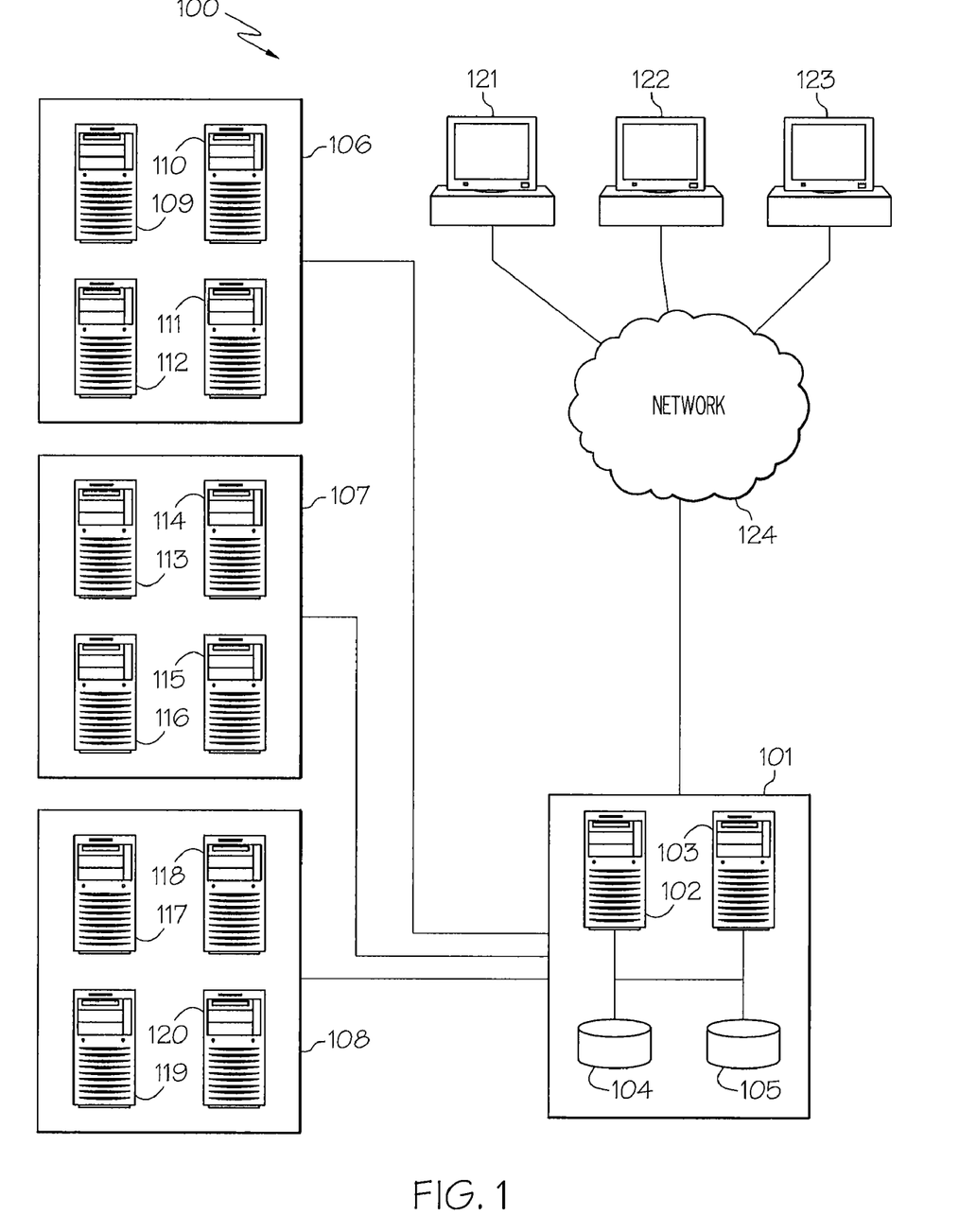
FIG. 1 is a diagram of a system for automated credit risk management according to an example embodiment of the present invention.

FIG. 1 shows a diagram of a system for automated credit risk management according to an example embodiment of the present invention. The system 100 may include an automated risk management system (ARMS) 101 that may include one or more servers 102, 103, and one or more storage devices 104, 105. The automated risk management system 101 may be interconnected to one or more marketable securities loan subsystems 106, one or more a collateral subsystems 107, and one or more securities subsystems 108, either directly and/or via one or more networks (not shown). The automated risk management system 101 may also be interconnected to one or more workstations 121, 122, 123 either directly or through a network 124. The network 124 may be any type of network, for example, the Internet.

The marketable securities loan subsystem 106 may include one or more servers 109, 110, 111, 112, where each server may manage and/or contain marketable securities loan information for one or more individuals or entities. An entity may be any type entity having a marketable securities loan such as, for example, a company, an organization, a group, a government, etc. These marketable securities loans may be consumer loans and/or commercial loans. Each server 109-112 in the marketable securities loan subsystem 106 may process or manage a specific marketable securities loan (e.g. consumer marketable securities loans) or may manage or process different types of marketable securities loans (e.g. consumer, commercial, etc.). For example, one server 109 may be a part of a consumer marketable securities loan system (e.g., ALS) and may contain information on, process and/or manage only consumer type marketable securities loans. Further, another server 110 may be a part of a commercial marketable securities loan system (e.g., AFS EAst) and may contain information on, process and/or manage only commercial type marketable securities loans.

The collateral subsystem 107 may include one or more servers 113, 114, 115, 116 that may contain information on, manage and/or process different types of collateral used for supporting marketable securities loans. The one or more servers 113-116 may be part of any of many different types of collateral systems such as, for example, PACE, BAISI, BAS, etc. BAISI and BAS are trading accounts (on-line and full service brokerage) in which securities are traded on all the major markets. PACE is a trust custodial account in which trading can be done but by a third party brokerage firm. The security subsystem 108 may contain one or more servers 117, 118, 119, 120; that may include the most recent stock market information on various securities and other market information. This includes securities associated with the collateral. The automated risk management system 101 may automatically retrieve market close information on a periodic basis from the securities servers 117-120 of the securities subsystem 108. For example, the automated risk management subsystem 101 may automatically retrieve market close information related to securities from an IDC server.

According to embodiments of the present invention, an automated risk management system 101 may also be interconnected to other types of servers and/or subsystems such as, for example, trade line systems (e.g., TBM), letters of credit systems, specialized product systems (e.g., UNIX), systems containing industry summaries (e.g., ECRIS) or other information related to borrowers of the marketable securities loans, etc. The automated risk management subsystem 101 may periodically retrieve information from the marketable securities loan subsystem 106, the collateral subsystem 107, the securities subsystem 108, and other subsystems, store this information in a memory or database in a storage device 104, 105 at the automated risk management system 101, and make this information available to one or more workstations, 121-123. For example, the automated risk management system 101 may manipulate the stored data and provide updates to this data based on retrieval of more current market prices of securities and latest marketable securities loan information. This data may be further manipulated by a user at a workstation 121-123, to answer questions that an administrator or user may have related to a borrower associated with a marketable securities loan.

Files may be extracted from each server 109-112 of the marketable securities loan subsystem 106 and each server 113-116 of the collateral subsystem 107 and collected by one or more servers 102, 103 at the automated risk management system 101 via File Transfer Protocol (FTP). UNIX and Oracle scripts may be used at the automated risk management system 101 to load the collected data to the automated risk management system 101 where it may be stored in one or more storage devices 104, 105. The collected data may be stored in one or more databases in the one or more storage devices 104, 105. Further, in embodiments according to the present invention, one storage device 104 may be used as a primary storage device while a second storage device 105 may be used as a backup storage device. Similarly, one server 102 may be used as a primary server and a second server 103 may be used as a backup server.

Moreover, according to embodiments of the present invention, the one or more servers 102, 103 at the automated risk management system 101 may have one or more different processes running in order to support collection of the data from the marketable securities loan subsystem 106, the collateral subsystem 107 and the other subsystems. For example, a kickoff job process may initialize database settings in the storage devices 104, 105 and determine if a periodic collection of data should be performed. Further, a file-check job may confirm a current date and if it is a current day of the week, for example, new data may be collected from the marketable securities loan subsystem 106, the collateral subsystem 107, and the other subsystems. Once all data files have been retrieved, they may be stored in one or more databases in the one or more storage device 104, 105 at the automated risk management system 101.

A collate load process may load data files from the various subsystems to staging tables by different criteria such as, for example, by data type, obligor, commitment, obligation, collateral, etc. Commitment records may be built on a hierarchy table, and records may be added to a measure table by collateral type. Data flags may be set to recognize active manual updates to records. An investment management account load (IMALOAD) job process may load the data from the collateral subsystem 107 to one or more data tables (e.g. a staging table, restricted data tables, etc.). Assets from the collateral data may be flagged for exclusion from the collateral value calculation. Included collateral values may be calculated to determine market value for each account (i.e., how much collateral can be used to cover the marketable securities loan exposure).

In addition, a wrap-up job process may perform a margining process in which the automated risk management system 101 analyzes all collateral and marketable securities loans to which the collateral is tied. Collateral pools may be built and passed through a multi step process to distribute the collateral to all marketable securities loans with outstanding balances. The multi-step process (e.g., 12 steps) may allocate the collateral to cover marketable securities loans based on criteria such as, for example, collateral support type, ownership, collateral balance, etc. The support type may be used to determine if the collateral is shared. If there is not enough collateral available to cover the total outstanding for all marketable securities loans to be supported by the collateral, all marketable securities loans which have used the collateral may be considered to be "out of margin". If the collateral available will cover total outstanding for all marketable securities loans to be supported by the collateral, the marketable securities loans may all be considered to be "in margin". Marketable securities loans that are considered "out of margin" may be subject to margin calls. Calculations may be performed in the collateral allocation and pooling processes to determine collateral value, advance value, loan to value, loan to maintenance value, collateral surplus or shortfall. These calculations may produce data that may be accessed by the one or more workstations 121-123 for analysis and manipulation.

An amount available to advance (AAA) processing routine may perform an advance value process in which the automated risk management system 101 analyzes all collateral and marketable securities loans to which the collateral is tied. Collateral pools may be passed through a multi-step process to distribute the collateral to all marketable securities loans with outstanding balances, as noted previously. The multi-step process may allocate collateral to marketable securities loans based on collateral support type, ownership and/or collateral balance. The support type may be used to determine if the collateral is shared. If there is not enough collateral available to cover the total outstanding for all marketable securities loans to be supported by the collateral, all marketable securities loans which have used the collateral may be considered to have "zero available to advance". If the collateral available will cover the total outstanding for all marketable securities loans to be supported by the collateral, the marketable securities loans may all be considered to have the lesser of the advanced value available or the commitment amount has the amount available to advance. According to embodiments of the present invention, calculations performed in the advanced value allocation and pooling process may determine advanced value and contribute to surplus or shortfall. These calculations may provide the data for the analysis performed at the one or more workstations 121-123.

According to embodiments of the present invention, data collected from the marketable securities loan subsystem 106 and the collateral subsystem 107 may be organized into one or more tables. These tables may be used to group and make calculations on the gathered data. The information in the one or more tables may be made available to the one or more workstations 121-123. The one or more workstations 121-123 may access the gathered marketable securities loan information data, collateral data and any calculations made on this data using a graphical user interface (GUI). For example, a user at a workstation may input criteria and get data from the database containing information related to the criteria at the automated risk management system 101. A user or administrator at a workstation 121-123 may input information such as a customer number, a marketable securities loan number, collateral, etc., to retrieve associated information from the database. Further, a user may use a workstation 121-123 that has a collateral evaluation tool installed where a user may again enter input criteria and the evaluation tool may access the database and return information related to the criteria to the workstation in a desired format. The collateral evaluation tool may be a spreadsheet application (e.g., MS Excel™) where the collaboration tool may retrieve the information and display it to the user at the workstation 121-123 in the form of a spreadsheet or worksheet. Moreover, a user at a workstation 121-123 may generate and use Structured Query Language (SQL) queries against the database containing the information to retrieve desired information. The SQL queries may result in the retrieved data being formatted into a report for the requesting user. As noted previously, the collected data from the marketable securities loan subsystem 106 and the collateral subsystem 107 may be organized into various types of tables such as, for example, obligor table, obligation table, collateral table, IMA collateral table, pricing table, rate overrides, etc. An audit trail may be created and written to an audit log. Updates to the various tables may be applied after new data has been retrieved and collected.

According to embodiments of the present invention, an automated process may be performed where each collateral asset may be analyzed to determine if it should be included or excluded from the collateral pool. A rate override process may check for manual overrides and set a call-rate, an advance rate and a cure rate for all investment management account collateral. Rates may be set based on bank credit policy and marketable securities loan agreement requirements. Moreover, according to embodiments of the present invention, event alerts may be created periodically (e.g., daily) and reported to support the identification of under margin loans, vulnerable loans, collateral conditions that should be investigated, etc. These alerts may be generated at the automated risk management system 101 and reported to the one or more workstations 121-123.

Moreover, according to embodiments of the present invention, rules may be set in place and used to evaluate the data against. For example, rules may exist that evaluate the data against several risk and credit criteria to determine exposure and/or concern. Further, rules may be used to extract and collect the data from the marketable securities loan subsystem and the collateral subsystem and other subsystems. In addition, rules may be used to determine margin status, the number of collateral pools, and the number of passes of the data for processing. Also, rules may be used to generate a risk management table usable by the one or more workstations 121-123. One or more of these rules may be user defined rules and also may be inserted into a table causing the processing at the automated risk management system 101 to act upon (e.g. rules for collecting data, variable rules set up for different financial systems, rules excluding certain securities, etc.).

Figure 2:
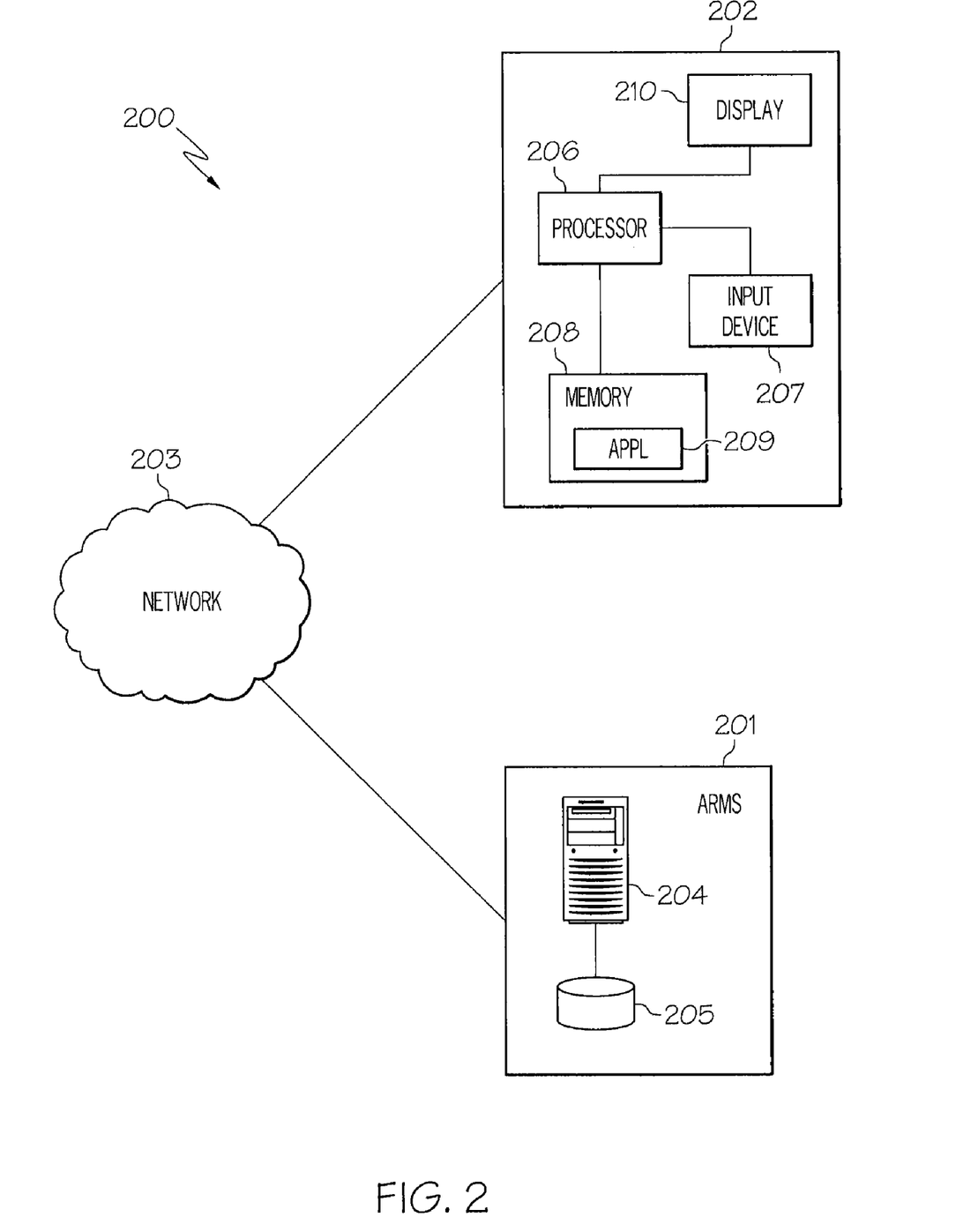
FIG. 2 is a diagram of a system for automated credit risk management according to another embodiment of the present invention.

FIG. 2 shows a diagram of a system for automated credit risk management according to another embodiment of the present invention. The system 200 may include an automated risk management system 201 and a workstation 202 interconnected via a network 203. The network may be any type of network such as, for example, the Internet. The automated risk management system 201 may include a server 204 that retrieves current marketable securities loan information and collateral information associated with each marketable securities loan as well as current market information and stores this information in a database 205. The workstation 202 may include a processor 206, an input device 207, a memory 208 and a display 210. A user at the workstation 202 may enter criteria using the input device 207 that are received and processed by a collateral tool that may be an application 209 in the memory 208. The collateral tool application 209 may access the database 205 at the automated risk management system 201 to retrieve information related to at least one of a marketable securities loan, collateral, securities, customer information, etc. as defined by the entered criteria. The collateral tool application 209 may then present this information on the display 210 of the workstation 202 for review by the user. The collateral tool application 209 may be a spreadsheet application (e.g., MS Excel™) that formats the retrieved data from the database 205 into a worksheet format for review and further analysis by the user. Further, the collateral tool application 209 may not be a spreadsheet application but may be an application that retrieves the information from the database 205 and prepares reports for display on the display 210 to the user or may simply retrieve the information using a graphical user interface and present the information on the display 210.

Figure 3:
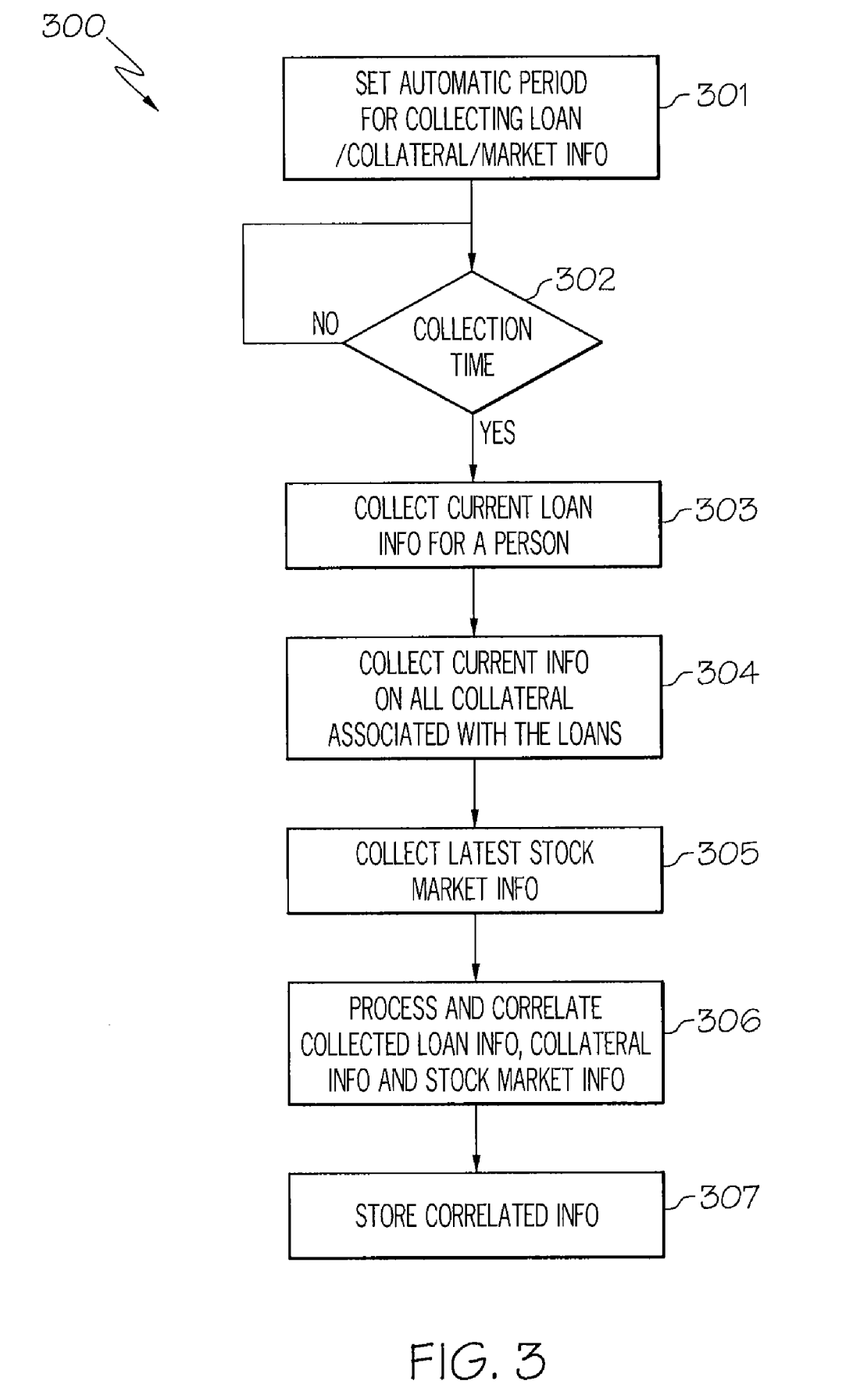
FIG. 3 is a flowchart of a process for automated credit risk management according to an example embodiment of the present invention.

FIG. 3 shows a flowchart of a process for automated credit risk management according to an example embodiment of the present invention. In the process 300 in block 301, an automatic period for collecting marketable securities loan information, collateral information, and market information may be set. In block 302 it may be determined if a current time is the collection time set and if not, the process waits for the collection time. If it is the collection time, then in block 303 current marketable securities loan information may be collected for one or more borrowers. In block 304, current information on all collateral associated with the marketable securities loans may be collected. In block 305, the latest securities or stock market information may be collected. In block 306, the collected marketable securities loan information, collateral information and stock market information may be processed and correlated. In block 307, the processed and correlated information may be stored.

Figure 4:
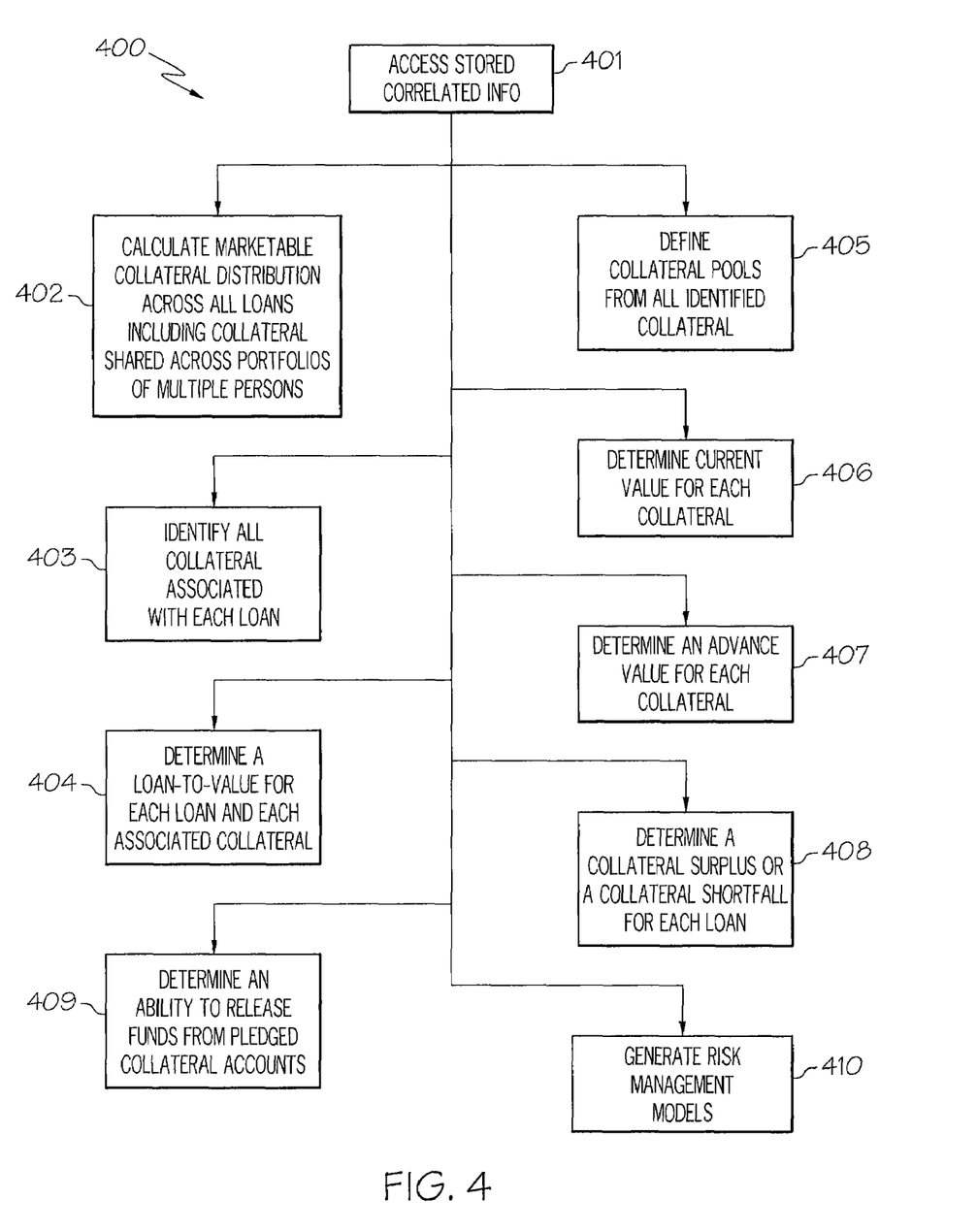
FIG. 4 is a flowchart of a process at a workstation for automated credit risk management according to an example embodiment of the present invention.

FIG. 4 shows a flowchart of a process at a workstation for automated credit risk management according to an example embodiment of the present invention. In the process 400, in block 401, stored processed and correlated information related to a marketable securities loan of a customer and associated collateral and current market information may be accessed. Then, based on desired criteria input at the workstation, a user at the workstation may obtain and/or generate various types of information from the stored information. For example, in block 402 a marketable collateral distribution across all marketable securities loans including collateral shared across portfolios of multiple persons may be calculated. In block 403, all collateral associated with each marketable securities loan may be identified. In block 404, a loan-to-value for each marketable securities loan and associated collateral may be determined. In block 405, collateral pools from all identified collateral may be defined. In block 406, a current value for each collateral may be determined. In block 407, an advance value for each collateral may be determined. In block 408, a collateral surplus or a collateral short fall (call value) for each marketable securities loan may be determined. In block 409, an ability to release funds from pledged collateral accounts may be determined. In block 410, risk management models may be generated. All of the above may occur either from the stored information directly or from further processing at the workstation on the retrieved stored information.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method operable on a server for automated credit risk management comprising:

collecting, by the server, current information on at least two marketable securities loans of at least one person;

collecting, by the server, current information on collateral associated with each at least two marketable securities loans;

collecting, by the server, current stock market information associated with the collateral;

processing and correlating, by the server, the collected loan information, collateral information, and stock market information; and calculating, by the server, a marketable collateral distribution for at least two of the marketable security loans based on the collected marketable security loan information, collected collateral information and collected stock market information, wherein the marketable collateral distribution is distributed across one of (a) a first plurality of marketable security loans associated with one person's loan portfolio or (b) a second plurality of marketable security loans, each of the second loans associated with a different person's loan portfolio.

2. The method according to claim 1, the processing and correlating further comprising determining a current market value of the collateral.

3. The method according to claim 1, further comprising generating, by the server, an alert for each of the at least one marketable securities loan that is at least one of out of margin or determined vulnerable.

4. The method according to claim 1, the calculating further comprising building, by the server, collateral pools from the collateral and passing the collateral pools through a multi-step process to determine a value for each collateral, an advance value for each collateral, a loan to value for each at least one marketable securities loan and each collateral, and one of a collateral surplus or a collateral shortfall for each at least one marketable securities loan.

5. The method according to claim 4, wherein the multi-step process comprises twelve steps.

6. The method according to claim 4, wherein the multi-step process comprises allocating the collateral to cover the at least one marketable securities loan based on at least one of how each of the collateral is shared, ownership of each of the collateral, or a collateral balance of each of the collateral.

7. The method according to claim 1, further comprising the collecting the current information on the at least one marketable securities loan, the collecting the current information on the collateral, the collecting the current stock market information, and the processing and correlating the collected marketable securities loan information, collateral information, and stock market information being performed automatically by the server on a periodic basis.

8. The method according to claim 1, further comprising storing, by the server, the collected marketable securities loan information, collateral information, and stock market information in a database at a server.

9. The method according to claim 8, further comprising accessing the database by a user at a workstation, the processed and correlated information being usable at the workstation for at least one of loan to value evaluation, margin monitoring, collateral evaluation and analysis, ability to advance funds assessment, ability to release funds from pledged collateral accounts, or risk management modeling.

10. The method according to claim 9, the workstation including a software application for processing the processed and correlated information for performing the at least one of loan to value evaluation, margin monitoring, collateral evaluation and analysis, ability to advance funds assessment, ability to release funds from pledged collateral accounts, or risk management modeling.

11. The method according to claim 10, the software application comprising an add-in to a spreadsheet application.

12. A system for automated credit risk management comprising:
a marketable securities loan subsystem, the marketable securities loan subsystem comprising at least one server containing information on at least two marketable securities loans for at least one person;
a collateral subsystem, the collateral subsystem comprising at least one server containing information on collateral related to the marketable securities loans;
a securities subsystem, the securities subsystem comprising at least one server containing most recent stock market information on securities associated with the collateral;
an automated risk management system (ARMS), the ARMS automatically periodically retrieving the information on the at least one marketable securities loan, the collateral related to the marketable securities loan, and the stock market and processing and correlating the retrieved information; and
at least one workstation, each at least one workstation capable of accessing the ARMS and using the processed and correlated information to calculate a marketable collateral distribution for at least two of the marketable security loans based on the collected marketable security loan information, collected collateral information and collected stock market information, wherein the marketable collateral distribution is distributed across one of (a) a first plurality of marketable security loans associated with one person's loan portfolio or (b) a second plurality of marketable security loans, each of the second loans associated with a different person's loan portfolio.

13. The system according to claim 12, the workstation including a software application for processing the processed and correlated information for performing the at least one of loan to value evaluation, margin monitoring, collateral evaluation, ability to advance funds assessment, or risk management.

14. The system according to claim 13, the software application comprising an add-in to a spreadsheet application.

15. The system according to claim 12, the ARMS further comprising a database, the database storing the retrieved information on the at least one marketable securities loan, the collateral related to the marketable securities loan, and the stock market, and the processed and correlated information.

16. A server comprising:
a processor;
a database; and
a network interface,
wherein the server automatically periodically collects current information on at least two marketable securities loans of at least one person, current information on collateral associated with each at least two marketable securities loans, and current stock market information associated with the collateral over the network interface, processes and correlates the collected marketable securities loan information, collateral information, and stock market information, and stores the processed and correlated information in the database, and
wherein the processor processes the processed and correlated information and calculates a marketable collateral distribution for at least two of the marketable security loans based on the collected marketable security loan information, collected collateral information and collected stock market information, wherein the marketable collateral distribution is distributed across one of (a) a first plurality of marketable security loans associated with one person's loan portfolio or (b) a second plurality of marketable security loans, each of the second loans associated with a different person's loan portfolio.

17. The server according to claim 16, further comprising a second network interface, the second network interface operatively connected to at least one workstation.

18. The server according to claim 17, wherein the first network interface and the second network interface are the same interface.

19. The server according to claim 17, the processed and correlated information being usable at each at least one workstation for at least one of loan to value evaluation, margin monitoring, collateral evaluation, ability to advance funds assessment, or risk management.

20. An apparatus comprising a storage medium with instructions stored therein, the instructions when executed causing a processing device to perform:

collecting current information on at least two marketable securities loans of at least one person;

collecting current information on collateral associated with each at least two marketable securities loans;

collecting current stock market information associated with the collateral;

processing and correlating the collected marketable securities loan information, collateral information, and stock market information; and calculating a marketable collateral distribution for at least two of the marketable security loans based on the collected marketable security loan information, collected collateral information and collected stock market information, wherein the marketable collateral distribution is distributed across one of (a) a first plurality of marketable security loans associated with one person's loan portfolio or (b) a second plurality of marketable security loans, each of the second loans associated with a different person's loan portfolio.

\* \* \* \* \*